United States Patent
Das

(10) Patent No.: US 8,971,887 B2
(45) Date of Patent: Mar. 3, 2015

(54) SERVICE PROVIDER INITIATED ACCESS NETWORK SELECTION

(75) Inventor: Swapan Das, Canton, MI (US)

(73) Assignee: General Motors LLC, Detroit, MI (US)

(*) Notice: Subject to any disclaimer, the term of this patent is extended or adjusted under 35 U.S.C. 154(b) by 1074 days.

(21) Appl. No.: 11/780,977

(22) Filed: Jul. 20, 2007

(65) Prior Publication Data

US 2009/0023446 A1  Jan. 22, 2009

(51) Int. Cl.
*H04W 4/00* (2009.01)
*H04W 48/18* (2009.01)

(52) U.S. Cl.
CPC .................................. *H04W 48/18* (2013.01)
USPC ........................................ 455/435.2; 455/436

(58) Field of Classification Search
USPC ............... 455/435.2, 436, 426.1, 426.2, 425, 455/456.1, 456.2, 456.3, 456.5, 456.6, 512, 455/513, 161.1; 342/457
See application file for complete search history.

(56) References Cited

U.S. PATENT DOCUMENTS

| | | | |
|---|---|---|---|
| 6,198,919 B1 * | 3/2001 | Buytaert et al. | 455/426.1 |
| 2003/0087636 A1 | 5/2003 | Mazzara et al. | |
| 2004/0204069 A1 * | 10/2004 | Cui et al. | 455/557 |
| 2005/0090275 A1 * | 4/2005 | Wang | 455/512 |
| 2005/0136892 A1 | 6/2005 | Oesterling et al. | |
| 2005/0136978 A1 | 6/2005 | Kamdar et al. | |
| 2005/0215200 A1 | 9/2005 | Oesterling | |
| 2007/0105567 A1 * | 5/2007 | Mohanty et al. | 455/458 |
| 2007/0124045 A1 * | 5/2007 | Ayoub et al. | 701/36 |

* cited by examiner

*Primary Examiner* — Charles Appiah
*Assistant Examiner* — Alexander Yi
(74) *Attorney, Agent, or Firm* — Leydig, Voit & Mayer, Ltd.

(57) ABSTRACT

Examples of the invention allow a content service provider to utilize one or more overlapping wireless networks in a given area to efficiently and cost effectively deliver content and services to a mobile device contained within a terminal. Examples of the invention analyze the characteristics of each wireless network such as cost, latency, security, and bandwidth, the terminal capabilities, and the requested service to determine the most efficient manner to deliver services over one or more wireless networks in a given area. In addition, the service provider re-analyzes the efficiency of service delivery when the mobile device enters a new mobile area. Therefore, sustaining efficient content and service download throughout delivery.

16 Claims, 17 Drawing Sheets

| TYPE OF SERVICE 1020 | | CANDIDATE ACCESS NETWORK 1002 | | | | | |
|---|---|---|---|---|---|---|---|
| | | WLAN 1004 | WWAN 1006 | | | | WMAN 1008 |
| | | WIFI 1010 | CDMA2000 1012 | WCDMA 1014 | GSM 1016 | | WIMAX 1018 |
| VOICE 1022 | VOICE CALL 1028 | | X 1042 | X 1044 | X 1046 | | |
| | SMS 1030 | X 1054 | X 1048 | X 1050 | X 1052 | | |
| DATA 1024 | PARAMETER ADMIN 1032 | X 1058 | | | | | |
| | DIAGNOSTICS 1034 | X 1066 | X 1060 | X 1062 | X 1064 | | X 1056 |
| | SW DOWNLOAD 1036 | X 1070 | X 1071 | X 1073 | | | X 1068 |
| | STREAMING MEDIA 1038 | | X 1074 | X 1076 | | | X 1072 |
| VIDEO 1026 | VIDEO CALL 1040 | | | | | | |

| TERMINAL CAPABILITIES OF PROVIDING SERVICE 1123 | | AVAILABLE SERVICES OFFERED BY PROVIDER 1102 | | | | | | | |
|---|---|---|---|---|---|---|---|---|---|
| | | VOICE 1104 | DATA 1106 | | | | | | VIDEO 1108 |
| | | VOICE CALL 1110 | SMS 1112 | PARAMETER ADMIN 1114 | DIAGNOSTICS 1116 | SW DOWN-LOAD 1118 | STREAMING MEDIA 1120 | VIDEO CALL 1122 |
| VOICE 622 | VOICE CALL 628 | X 1124 | | | | | | |
| | SMS 630 | | X 1128 | | | | | |
| DATA 624 | PARAMETER ADMIN 632 | | | X 1130 | | | | |
| | DIAGNOSTICS 634 | | | | X 1132 | | | |
| | SW DOWNLOAD 636 | | | | | X 1134 | | |
| | STREAMING MEDIA 638 | X 1135 | | | | | X 1136 | |
| VIDEO 626 | VIDEO CALL 640 | | | | | | | |

1100

| Access Network Availability 1202 | WLAN 1004 | | WWAN 1006 | | | WMAN 1008 |
|---|---|---|---|---|---|---|
| | WIFI 1010 | CDMA2000 1012 | WCDMA 1014 | GSM 1016 | | WIMAX 1018 |
| Location 1 1204 | X 1214 | X 1216 | | | | |
| Location 2 1206 | X 1218 | | X 1220 | | | |
| Location 3 1208 | | | X 1222 | | | X 1224 |
| Location 4 1210 | | X 1226 | | | | X 1228 |

1200

CANDIDATE ACCESS NETWORK 1002

FIG. 12

| USER PREFERENCE 1302 | CANDIDATE ACCESS NETWORK 1002 | | | | | |
|---|---|---|---|---|---|---|
| | WLAN 1004 | WWAN 1006 | | | WMAN 1008 | |
| | WIFI 1010 | CDMA2000 1012 | WCDMA 1014 | GSM 1016 | WIMAX 1018 | |
| BANDWIDTH 1304 | 1 1312 | 3 1314 | 3 1316 | 3 1318 | 2 1320 | |
| SECURITY 1306 | 3 1322 | 1 1324 | 1 1326 | 1 1328 | 3 1330 | |
| LATENCY 1308 | 3 1332 | 1 1334 | 1 1336 | 1 1338 | 3 1340 | |
| COST 1310 | 1 1342 | 3 1344 | 5 1346 | 5 1348 | 2 1350 | |
| Efficiency Factor 1352 | 8 1354 | 8 1356 | 10 1358 | 10 1360 | 10 1362 | |

SERVICE PROVIDER INITIATED ACCESS NETWORK SELECTION

BACKGROUND

One of the fastest growing areas of communications technology is related to automobile network solutions. Almost all new American cars will have some level of telematics service, and with the increasing number and variety of these services, demands on telematics service call centers have also grown.

Telematics services include, but are not limited to turn-by-turn directions and other navigation-related services provided in conjunction with the GPS based chipsets and components, airbag deployment notification and other emergency or roadside assistance-related services provided in connection with various crash and or collision sensor interface modules and sensors located throughout the vehicle. Telematics services also include "infotainment-related" services where music, Web pages, movies, television programs, videogames and/or other content is downloaded by an "infotainment center" operatively connected to the telematics unit. For example, music content may be downloaded content for current or later playback.

With such a robust range of services, the telematics unit manufacturers and telematics service providers have a need to provide such requested services efficiently and cost effectively. A geographic area may have several overlapping wireless networks that are accessible to any mobile device. These include wireless wide area networks (WWAN) (e.g. CDMA2000, WCDMA), wireless metropolitan area networks (WMAN) (e.g. WiMAX), and wireless local area networks (WLAN) (e.g. WiFi). Historically, a service provider arbitrarily downloads content onto a mobile device through one of these networks. A service provider does not analyze all the networks with the application to determine the most efficient network(s) to download the application. Further, traditionally, when a mobile device exits one mobile area and enters another mobile area, roaming and handoff scenarios ensure continued downloading of an application. However, roaming and handoff scenarios may not be the most efficient and cost effective manner to continue downloading an application in the new mobile area. In addition, while the mobile device is within a given area, the mobile network status may change (i.e. equipment outage, bandwidth constrained, etc.) requiring a service provider deliver services through an inefficient wireless network.

Therefore, there is a need for a service provider to utilize overlapping mobile networks in a given area to cost effectively and efficiently deliver telematics services to the consumer when a user requests a service, a terminal updates its location, or an access network changes its status.

BRIEF SUMMARY

Examples of the invention allow a content service provider to utilize one or more overlapping wireless networks in a given area to efficiently and cost effectively deliver content and services to a mobile device contained within a terminal. Examples of the invention analyze the characteristics of each wireless network such as cost, latency, security, and bandwidth, the terminal capabilities, and the requested service to determine the most efficient manner to deliver services over one or more wireless networks in a given area. In addition, the service provider reanalyzes the efficiency of service delivery when the mobile device enters a new mobile area or when there is a change in network status. Therefore, sustaining efficient content and service download throughout delivery.

BRIEF DESCRIPTION OF THE SEVERAL VIEWS OF THE DRAWINGS

FIG. 10 illustrates an exemplary table of services offered across candidate wireless access networks;

FIG. 11 illustrates an exemplary table of services offered by a service provider compared to terminal capabilities;

FIG. 12 illustrates an exemplary table of network availability of candidate wireless access networks;

FIG. 13 illustrates an exemplary table of terminal user preferences supporting candidate wireless access networks based on network characteristics.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
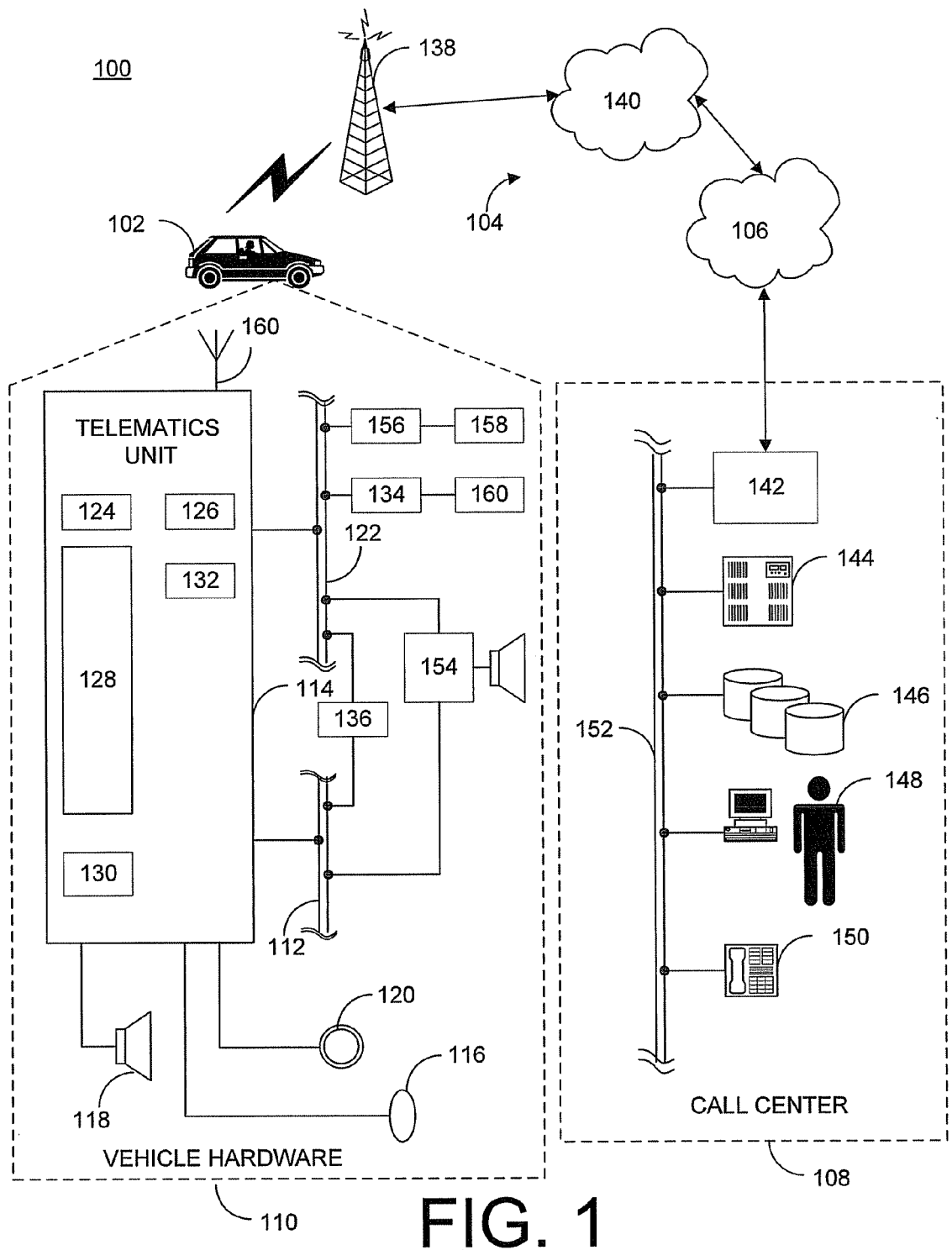
FIG. 1 is a schematic view of an example communication system within which examples of the present invention may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
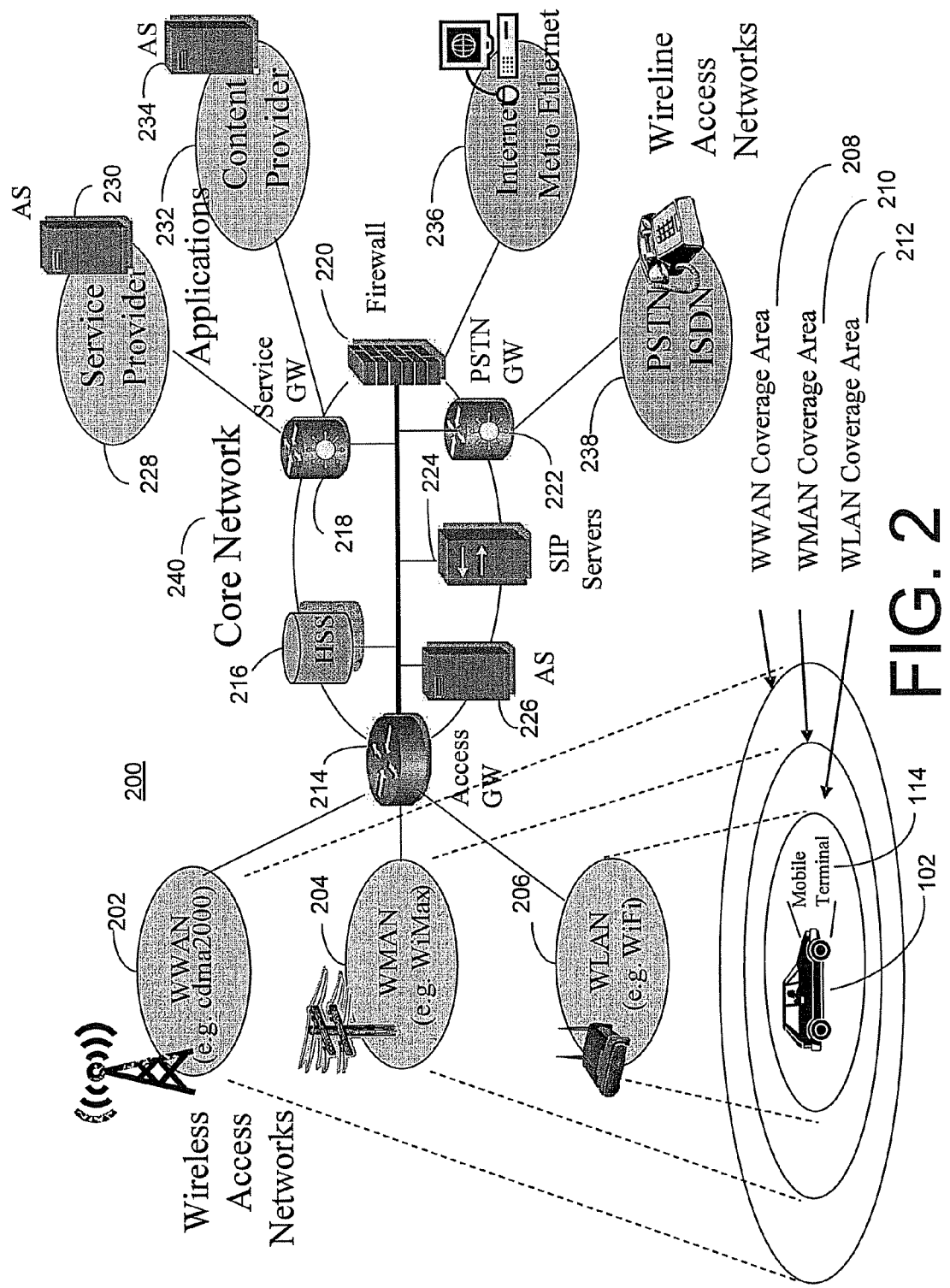
FIG. 2 illustrates a general architectural overview of a system contemplated by an exemplary implementation.

FIG. 2 illustrates a general architectural overview of a system 200 contemplated by an exemplary implementation. In a given mobile area, a mobile terminal or telematics unit 114 may have access to three different types of wireless access networks that include wireless wide area networks (WWAN) (e.g., CDMA2000) 202, wireless metropolitan networks (WMAN) (e.g. WiMAX) 204, and wireless local area networks (WLAN) (e.g. WiFi) 206. Each access network provides different coverage in a given location (208, 210, and 212).

The Mobile Terminal 114 may access services and content through the access (202, 204, and 206) and core (240) networks from service (228) and content (232) providers. The core network (240) comprises of several components that include, but are not limited to, an Access Gateway 214, Home Subscriber Server (HSS) database 216, Service Gateway 218, Firewall 220, Public Switched Telephone (PSTN) Gateway 222, Session Initiated Protocol (SIP) Server 224, and Application Server (AS) 226. An Access Gateway 214 allows the mobile terminal to communicate with the core network as well as wireline networks (236 and 238) and service and content providers (228 and 232). An HSS database 216 is the master user database that supports the network entities that handle the calls and sessions. It contains user profiles, performs authentication and authorization of the user, and can provide user location information. It is similar to the Home Location Register in a GSM wireless network. The Service Gateway 218 provides access to service and content from the respective providers (228 and 232) to the core network 240. A Firewall 220 protects the core network from viruses, worms, and other electronic attacks from the Internet or Metro Ethernet 236. The PSTN Gateway 222 allows access from the PSTN and ISDN networks 238 to the core 240. SIP servers 224 provide an IP telephony signaling protocol used to establish, modify and terminate VOIP telephone calls. The Application Server (AS) 226 hosts and provides services from the core network to a mobile terminal. Providers (228 and 232) download their content and services from their application servers (230 and 234) through the core 240 and access networks (202, 204, and 206) to mobile terminal 114. Similarly, a mobile terminal 114 can access content and services from the PSTN 238 and the Internet 236. In another embodiment, the Internet may be utilized as the core network. In yet another embodiment, a private IP (Internet Protocol) network may be utilized as the core network.

Figure 3:
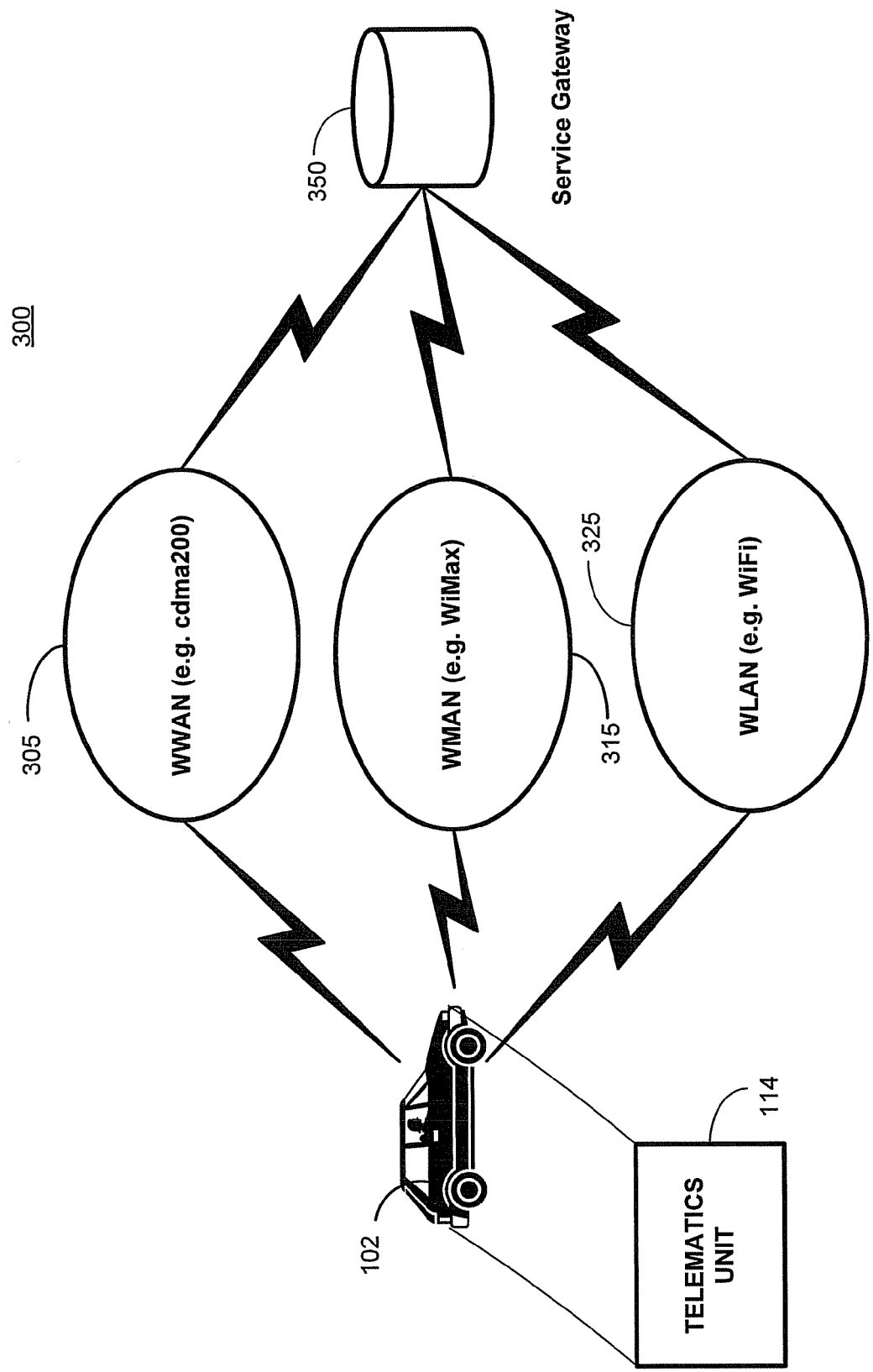
FIG. 3 illustrates a general architectural overview of a system contemplated by an exemplary implementation.

FIG. 3 illustrates a general architectural overview of a system 300 contemplated by an exemplary implementation. FIG. 3 illustrates an example of the invention where a telematics unit 114 contained within vehicle 102 may download content and services from a service provider through a service gateway 350. Further, the service provider may download the content or service through one or more wireless access networks such as a wireless wide area network (WWAN) (e.g. CDMA2000, WCDMA, GSM) 305, wireless metropolitan area network (WMAN) (e.g. WiMAX) 315, and a wireless local area network (WLAN) (e.g. WiFi) 325. A wireless access network allows a mobile terminal 114 to access a service provider to use services and download content. Note that a "mobile device" is synonymous with "cellular device". A mobile device 124 is contained within a telematics unit 114. A telematics unit 114 may also be referred to as a mobile terminal.

Figure 4:
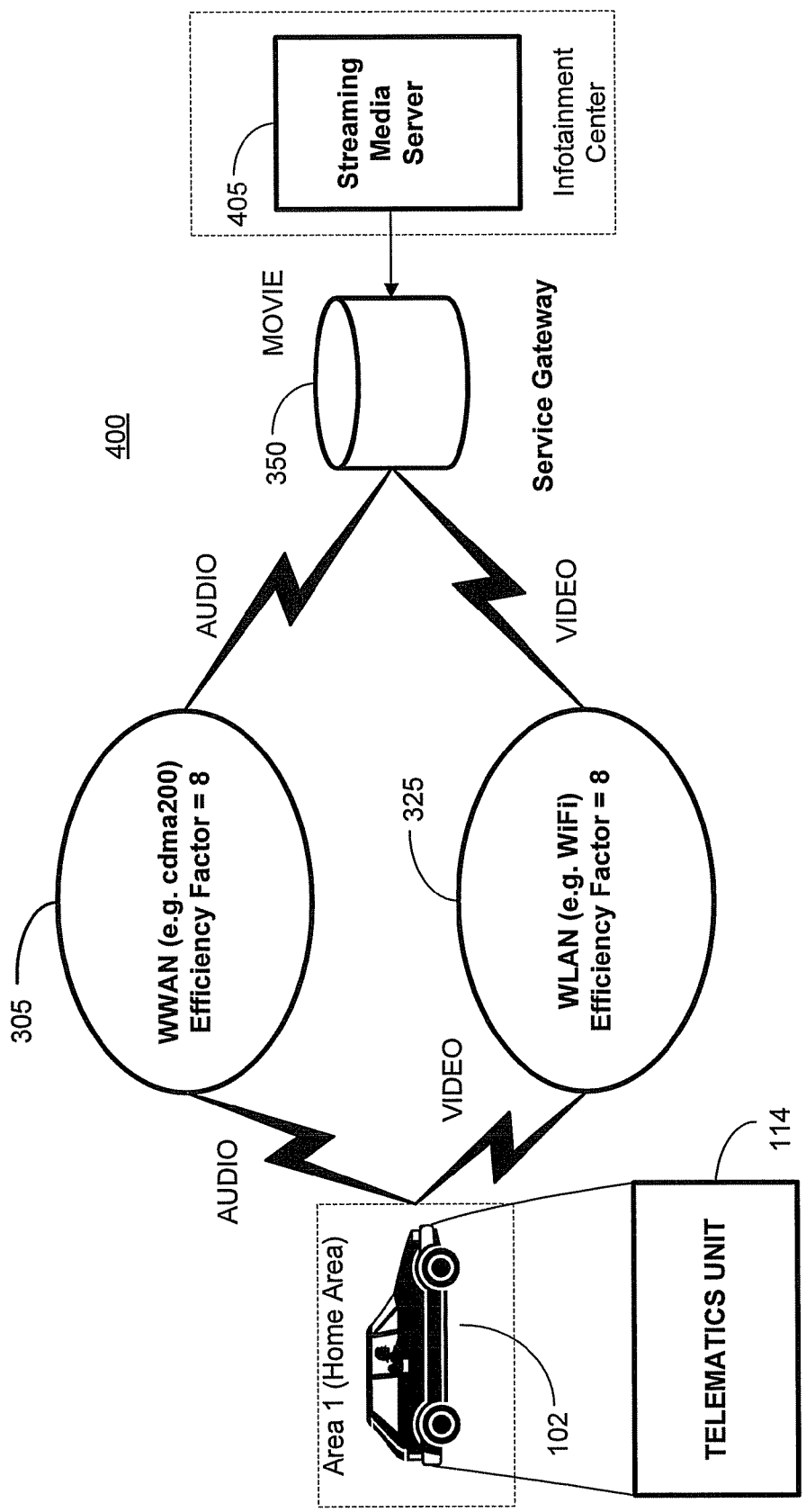
FIG. 4 illustrates a general architectural overview of a system contemplated by an exemplary implementation.

FIG. 4 illustrates a general architectural overview of a system 400 contemplated by an exemplary implementation. FIG. 4 illustrates an example of the invention where a telematics unit 114 contained in vehicle 102 requests to download a streaming media (i.e. movie) from the "infotainment center" of a service provider wherein the vehicle is located in Area 1 (home area). The service gateway 350 delivers the content from a streaming media application server 405. A streaming media application server 405 is located in the "infotainment center" of a service provider and contains content such as music and movies that may be downloaded upon request to a user. A service provider may offer other content and services that will be described when discussing FIG. 10. This streaming media application server 405 is analogous to application servers (230 and 234) depicted in FIG. 2. After analyzing the available networks, the service provider may determine the most efficient way to deliver the content is to download the audio portion of the application (i.e. movie) through the WWAN 305 and the video portion of the application through the WLAN 325. Details of this analysis will be provided when discussing FIG. 13. After completing the download, the telematics unit 114 assembles the audio and video portions of the content and presents it to the user.

Figure 5:
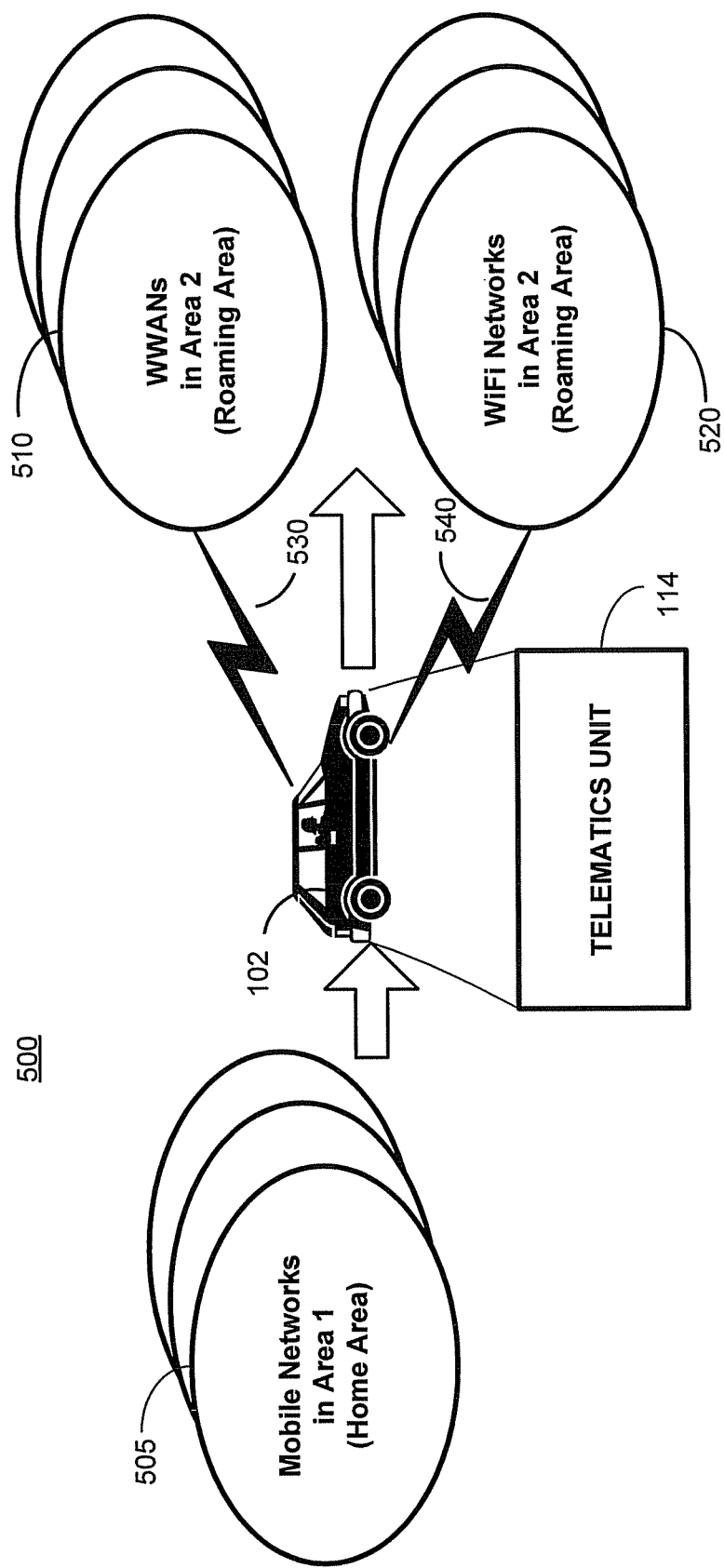
FIG. 5 illustrates a general architectural overview of a system contemplated by an exemplary implementation.
Figure 6:
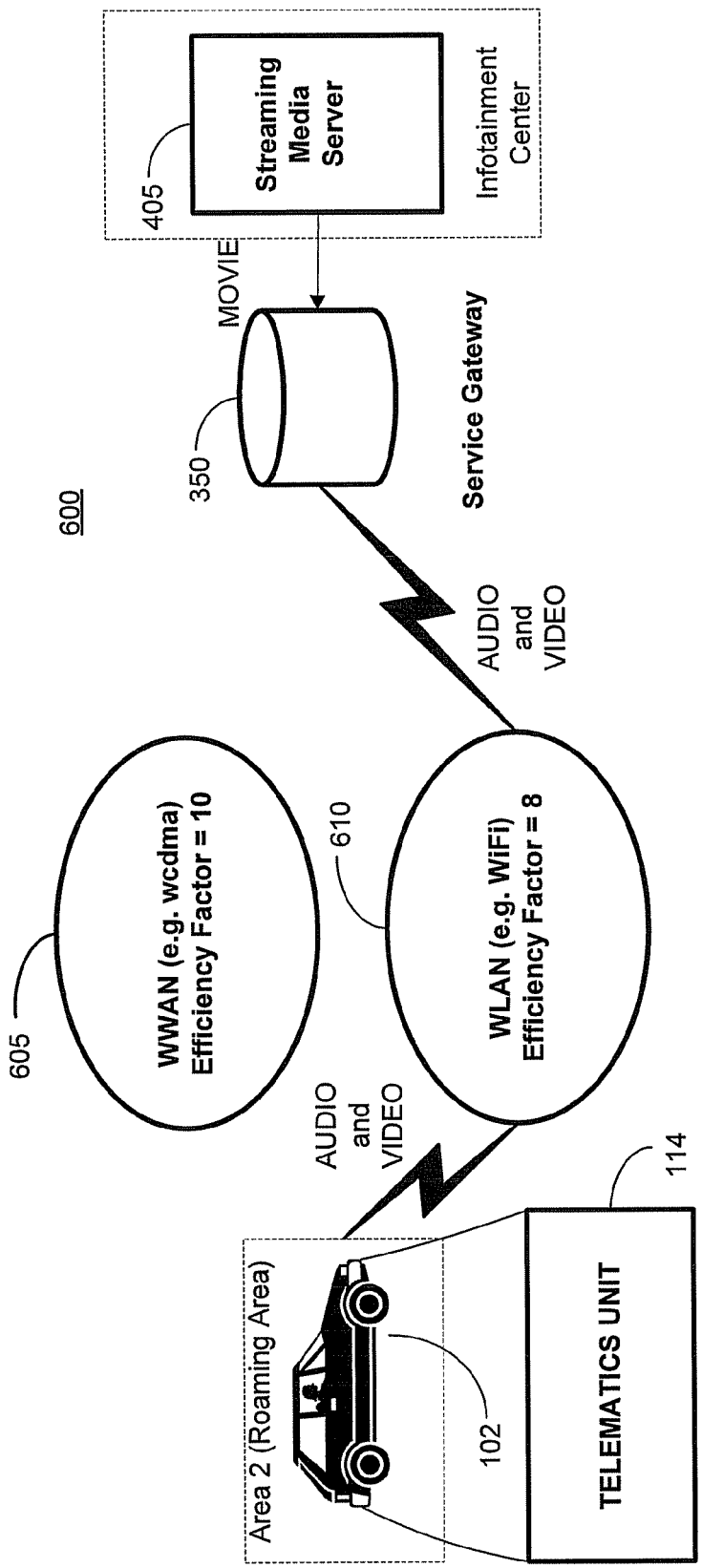
FIG. 6 illustrates a general architectural overview of a system contemplated by an exemplary implementation.

FIG. 5 illustrates a general architectural overview of a system 500 contemplated by an exemplary implementation. FIG. 5 illustrates an example where the telematics unit 114 contained in vehicle 102 exits mobile area 1 (home area) and enters mobile area 2 (roaming area). A home area is where a mobile device accesses its contracted wireless carrier, hence paying the lowest rate. Conversely, a roaming area is where a mobile device cannot access its contracted wireless carrier but may access another wireless carrier at a higher rate than its home area. Upon entering area 2, the service provider may re-analyze the efficiency of delivering the content in the new area. FIG. 6 illustrates a general architectural overview of a system 600. A service provider may determine that the most efficient manner to deliver content in the roaming area is to deliver all the content, both audio and video, across the WLAN 610 instead of sending the audio across a WWAN 605. This analysis will be discussed in more detail when describing FIG. 13.

Figure 7:
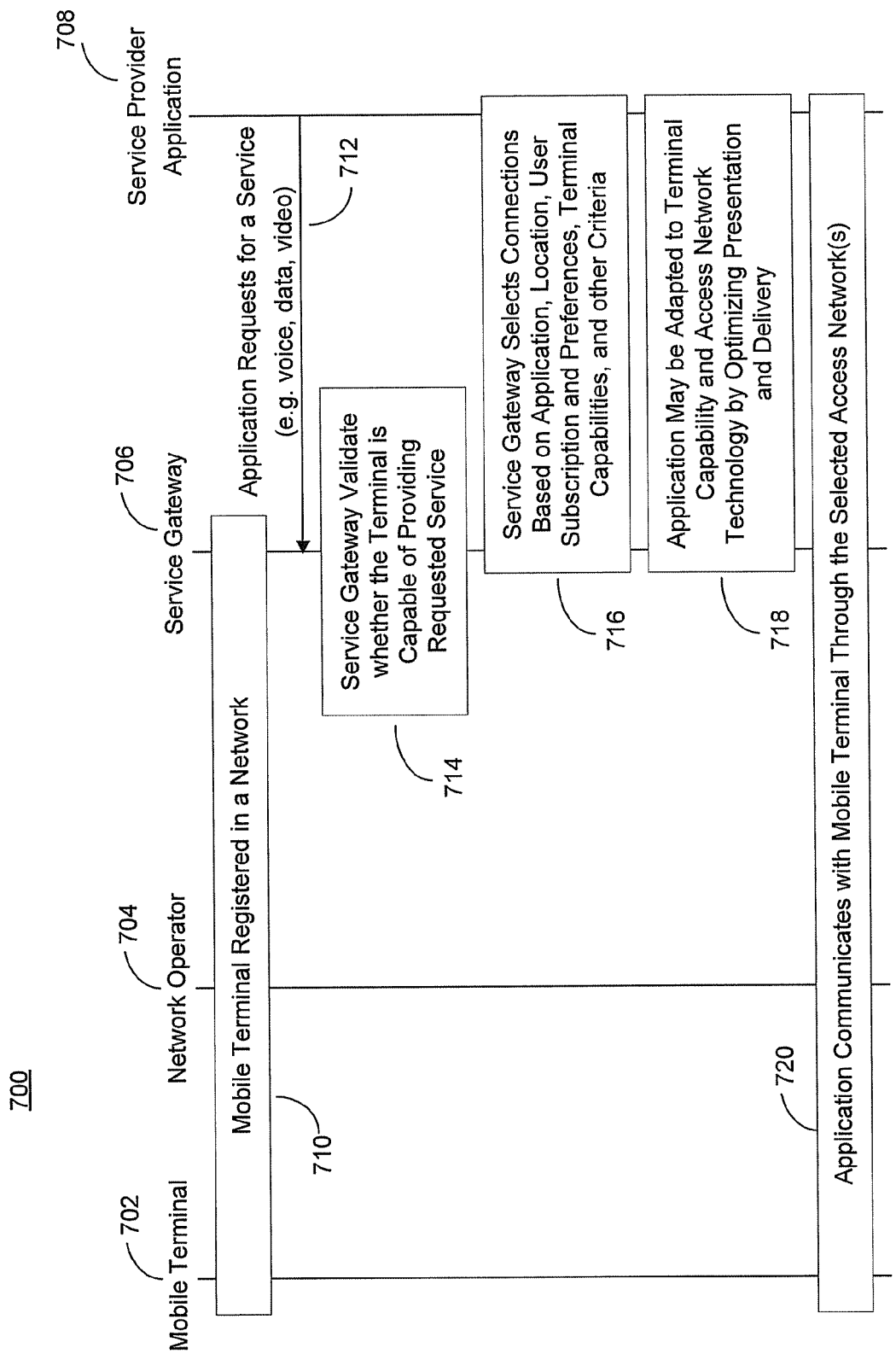
FIG. 7 is a flow diagram illustrating an exemplary method triggered by a request for service.

FIG. 7 is a flow diagram 700 illustrating an exemplary method triggered by a request for service. The actors in this flow diagram are a mobile terminal 702, network operator 704, service gateway 706 and service provider application 708. At stage 710, the mobile terminal is registered in a network. Network registration is known to the mobile terminal 702, the network operator 704, and the service gateway 706. At stage 712, service provider application 708 requests for a service (e.g. voice, data, or video) from the service gateway 706. At stage 714, the service gateway 706 validates whether the terminal is capable of providing the requested service. At stage 716, the Service Gateway 706 selects access network connections based on the application, mobile terminal location, user subscription and preferences, terminal capabilities, and other criteria that are further discussed when describing FIGS. 13-17. At stage 718, the application may be adapted to terminal capability and access network technology by optimizing presentation and delivery. For example, if the access network's bandwidth is constrained and the application requires color images, the service gateway may adapt the application to provide only black and white images to conserve bandwidth. At stage 720, application communicates with mobile terminal 702 through the selected access network(s).

Figure 8:
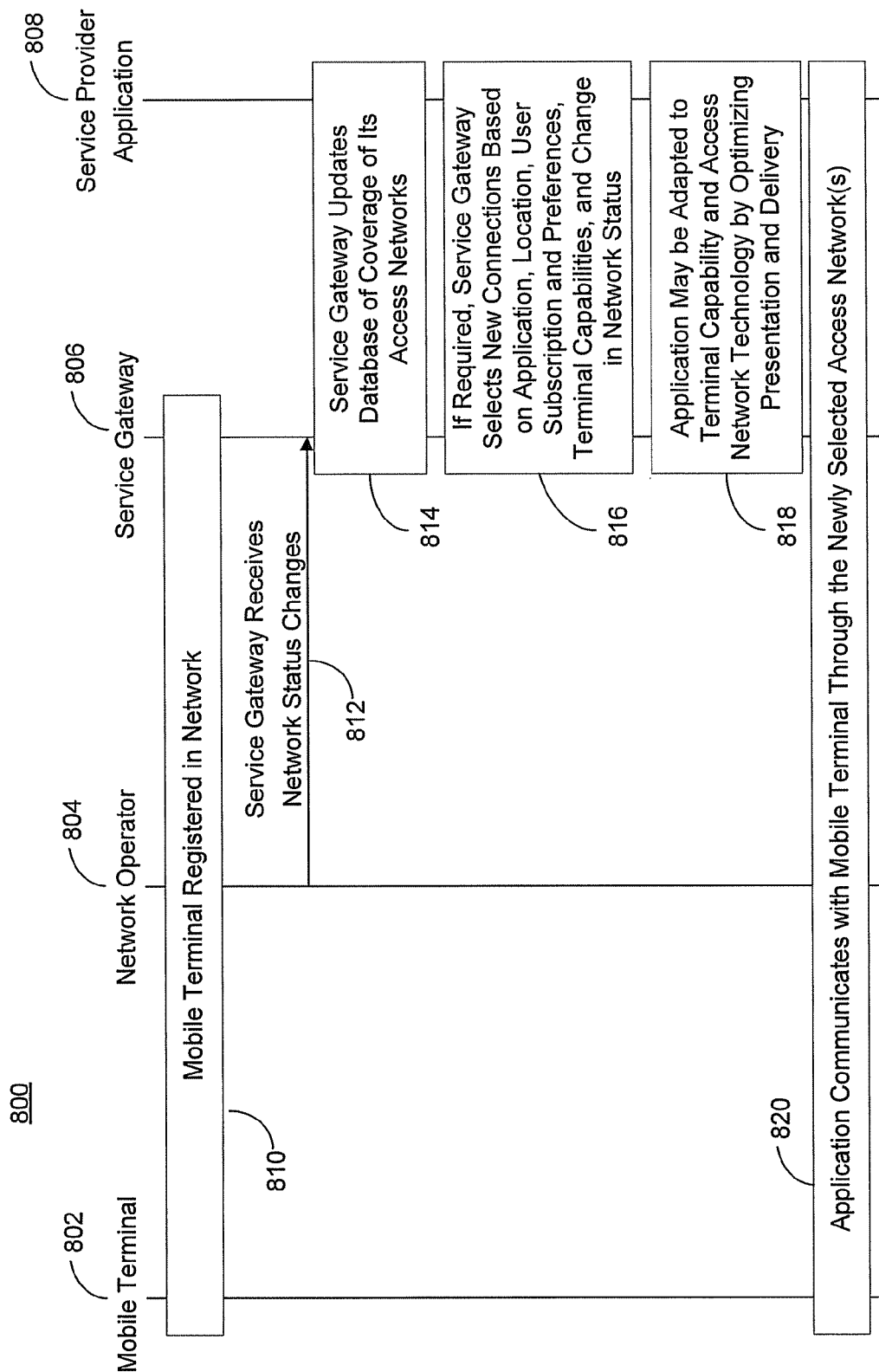
FIG. 8 is a flow diagram illustrating an exemplary method triggered by a change in network status.

FIG. 8 is a flow diagram 800 illustrating an exemplary method triggered a change in network status. The actors in this flow diagram identical to those in FIG. 7 and are a mobile terminal 802, network operator 804, service gateway 806 and service provider application 808. At stage 810, the mobile terminal 802 is registered in a network. Network registration is known to the mobile terminal 802, the network operator 804, and the service gateway 806. At stage 812, the service gateway 806 receives network status changes. At stage 814, the service gateway 806 updates database of coverage of its access networks with the network change information. At stage 816, if required, service gateway selects new connections based on application, mobile terminal location, user subscription and preferences, terminal capabilities, and change in network status. At stage 818, application may be adapted to terminal capability and access network technology by optimizing presentation and delivery, similar to the discussion when describing FIG. 7. At stage 820, application communicates with mobile terminal through the newly selected access network(s).

Figure 9:
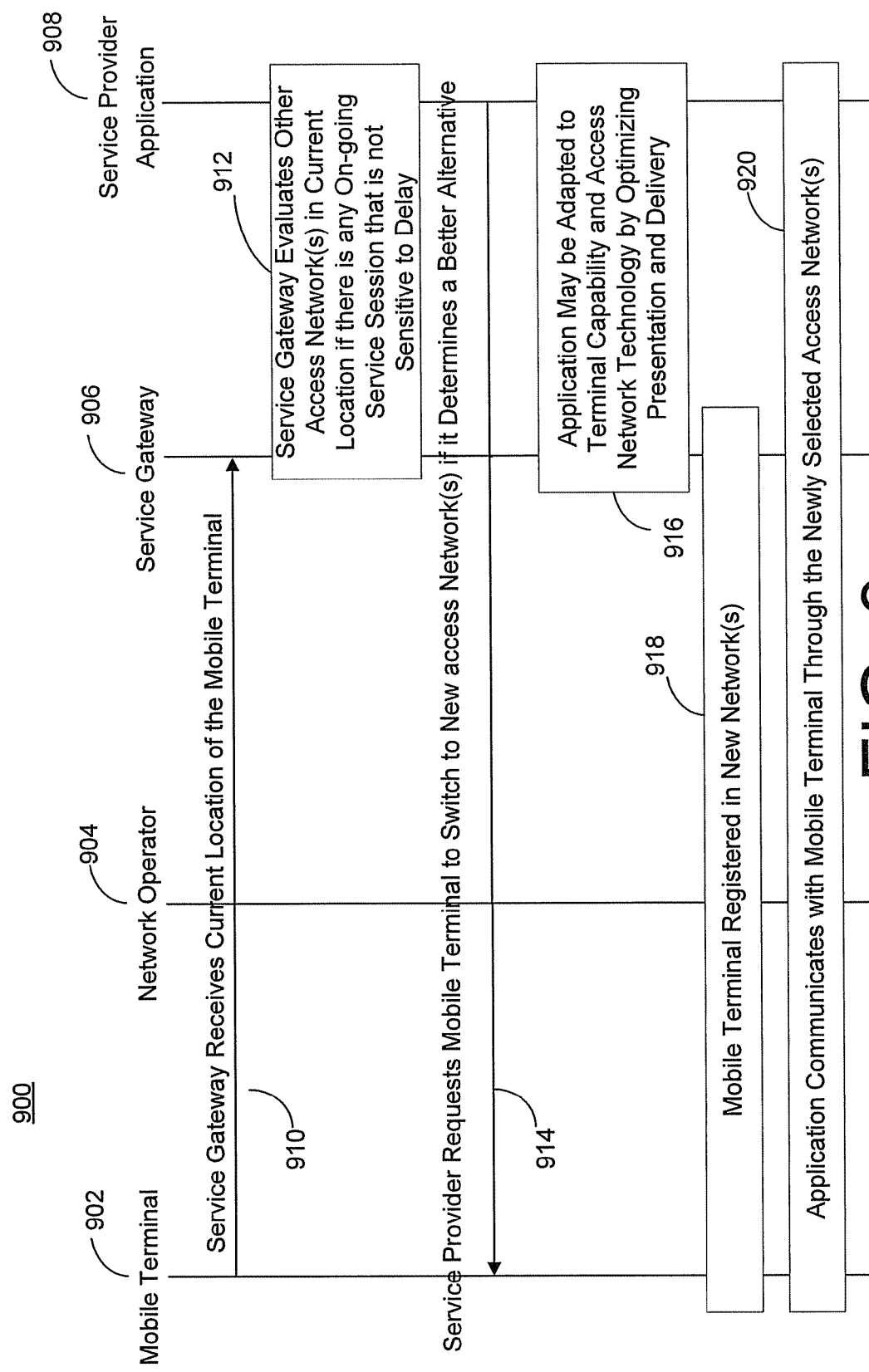
FIG. 9 is a flow diagram illustrating an exemplary method triggered by a new location of a mobile terminal.

FIG. 9 is a flow diagram 900 illustrating an exemplary method triggered by new location of a mobile terminal. The actors in this flow diagram are identical to those in FIGS. 7-8 and are a mobile terminal 902, network operator 904, service gateway 906 and service provider application 908. At stage 910, the service gateway 906 receives current location of the mobile terminal 902. At stage 912, service gateway evaluates other access network(s) in the current mobile terminal location if there is any ongoing service session that is not sensitive to delay. At stage 914, service provider requests mobile terminal to switch to new access network(s) if it determines a better alternative based on the user preferences and algorithm discussed in FIGS. 13-17. At stage 916, application may be adapted to terminal capability and access network technology by optimizing presentation and delivery. At stage 918, mobile terminal 902 is registered in the new network(s). At stage 920, application communicates with mobile terminal 902 through the newly selected access network(s).

FIG. 10 illustrates an exemplary table 1000 of the services offered across candidate wireless access networks. A candidate wireless access network is a wireless network available to a terminal in a given area. The example of the invention depicted in FIG. 10 shows the types of services 1020 offered by the service provider. These include voice 1022, data 1024, and video 1026 services. The service provider provides several data services that include short message service (SMS) 1030, parameter administration 1032, diagnostics, 1034, software download, 1036, and streaming media 1038. SMS is similar to text messaging technology found in many mobile devices used across many wireless networks. Parameter administration service allows a user or service provider to configure a telematics unit 114. Software download service provides upgrades or new services to the telematics unit 114. Diagnostics indicate the condition and welfare of subsystems within the telematics unit 114. Streaming media may be content (e.g. movies, music, etc.) that is downloaded to the telematics unit 114 from a service provider. In the illustrated example, the service provider only offers voice call service 1028 and video call service 1040 for voice 1022 and video 1026 services, respectively. In addition, the table in FIG. 10 shows that each service can be delivered across one or more overlapping wireless access networks. Candidate wireless access networks 1002 may be WLAN 1004 (e.g. WiFi 1010), WWAN, 1006 and WMAN (e.g. WiMAX 1018) 1008. There may be several WWANs available to a service provider such as CDMA2000 1012, WCDMA 1014, and GSM 1016. Examining FIG. 10 further, it can be seen that parameter administration, diagnostics, software download, and streaming media services (1054, 1058, 1066, and 1070) may be carried over a WiFi access network. Similarly, voice call services, SMS, diagnostics, streaming media, and video call services (1042, 1048, 1060, 1071, and 1074) may be carried over a CDMA2000 access network and over a WCDMA access network (1044, 1050, 1062, 1073, and 1076). Further, only voice call services 1046, SMS 1052, and diagnostics 1064 may be carried over a GSM access network. In addition, parameter administration 1056, software download 1068, and streaming media 1072 may be carried over a WiMAX access network.

FIG. 11 illustrates an exemplary table 1100 of services offered by a service provider compared to terminal capabilities. The service provider offers 1102 voice 1104, data 1106, and video 1108 services. Specific voice and video services include voice calls 1110 and video calls 1122, respectively. Available data services include SMS 1112, parameter administration 1114, diagnostics 1116, software download 1118, and streaming media 1120. Some terminals may not support certain services because a user has not subscribed to the service or a terminal has not been upgraded to support such a service. This table shows that the terminal may support all available services except video calls (1124 1128, 1130, 1132, 1134, and 1136). However, note that streaming media services also supports voice call services (1126 and 1135). Consequently, the audio portion of streaming media (e.g. movie), may be supported by the voice service, and the video portion can be supported by the data service as shown in FIG. 4.

FIG. 12 illustrates an exemplary table 1200 of the availability of supporting candidate wireless access networks. A terminal may not be capable of supporting every available wireless access network technology in a given location 1202. For example, FIG. 12 shows that the terminal may only support WiFi 1214, and CDMA2000 1216 wireless access network technologies in Location 1 1204. When the mobile terminal proceeds to Location 2 1206 it can support WiFi 1218 and WCDMA 1220. In Location 3 1208, the mobile terminal can support WCDMA 1222 and WiMAX 1224. In location 4 1210, the mobile terminal can support CDMA2000 1226 and WiMAX 1228.

FIG. 13 illustrates an exemplary table 1300 of terminal user preferences 1302 for quality of service supporting candidate wireless access networks based on network characteristics. Network characteristics may include bandwidth 1304, security 1306, latency 1308, and cost 1310. Note that the invention is not limited to only these preferences and characteristics. Bandwidth is the amount of data that can be transmitted across a network in a given period of time. Security is the degree of safety from fraud or deception when transmitting data across a network. Latency can be defined in several ways, but is general the time delay between transmission of data to the reception of data. Cost is the rate at which a user must pay for network access. A value is given for each characteristic across each wireless access technology (1312-1350). An efficiency factor 1352 is calculated for each wireless access network by summing the value of each characteristic (1354-1362). The efficiency factor is not limited to this type of calculation but may be calculated in different ways. These may include averaging characteristic values, a weighted averaging of values, etc.

Referring to the example illustrated in FIGS. 4-6 it may be shown that in the home area, a telematics unit 114 has available a CDMA2000 WWAN and a WiFi WLAN. Further, a user has requested a streaming media service. A service provider analyzes available wireless access networks, terminal capabilities in terms of both services and access technologies, and user preferences. In addition, a service provider optimizes the delivery of services based on the type of application. In this example, the streaming media application has two portions, audio and video. In this example, audio may be a voice call service and video may be a data service. Referring to the table in FIG. 13, sending streaming audio across either a WiFi network or a CDMA2000 network results in an efficiency factor of 8 (1354 and 1356), however, the latency is high in a WiFi network 1332 compared to a CDMA2000 network 1334. High latency deteriorates the quality of service for the user. Therefore, a service provider may choose to optimize presentation and delivery of the service by sending the audio portion of the streaming media across a CDMA2000 network as opposed to a WiFi network given each has the same efficiency factor. Similarly, sending the streaming video across either a WiFi network or a CDMA2000 network results in an efficiency factor of 8 (1354 and 1356), however, the cost of sending across a CDMA2000 network 1344 is higher than a WiFi network 1342. Thus, a service provider may optimize presentation and delivery of the streaming media by choosing to send the video portion across the CDMA2000 network (See FIG. 4).

However, if a mobile terminal enters a different mobile area (See FIG. 6) where the available networks are WiFi and WCDMA and not CDMA2000, then the service provider may need to re-evaluate its choice in delivering the streaming media. Previously, sending the audio portion across a CDMA2000 network (Efficiency Factor=8 (1356)) was the same efficiency as sending it across the WiFi network 1354 (See FIG. 4). Sending the video portion over the WiFi network resulted in an Efficiency Factor of 8 (1354). Thus, a total efficiency of sending the audio and video portions of the streaming media results in an Efficiency Factor of 16. Conversely, sending the video over a WCDMA (See FIG. 6) results in an Efficiency Factor of 10 1358. Thus, sending the video portion over the WCDMA network and the audio portion over the WiFi network results in a total Efficiency Factor of 18. However, sending both the audio portion and the video portion over the WiFi network would result in a lower Efficiency Factor of 16. Therefore, a service provider may choose to send both the audio and video portion of the streaming media over the WiFi network.

Figure 14:
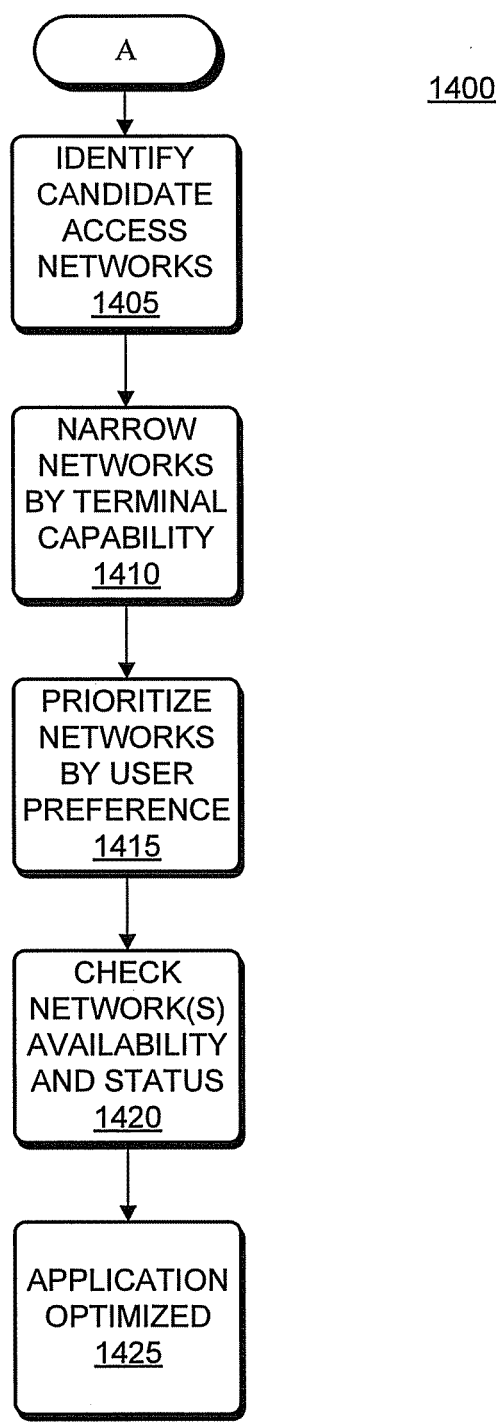
FIG. 14 is a flow diagram illustrating an exemplary method in efficiently delivering services over one or more wireless access networks.

FIG. 14 is a flow diagram 1400 illustrating an exemplary method in efficiently delivering services over one or more wireless access networks. The following algorithm is implemented by the service gateway when triggering events occur that include a request for service, terminal location change, and network status change. The algorithm will be further discussed in the context of each triggering event when describing FIGS. 15-17. At stage 1405 the service gateway identifies the candidate access networks for a mobile terminal for a particular service. At stage 1410, the service gateway narrows the candidate network by whether the mobile terminal is capable of supporting the service (See FIG. 11). At stage 1415, the service gateway prioritizes networks by user preference (See FIG. 13). At stage, 1420, the service gateway checks the network(s) availability and status. At stage 1425, the application is optimized for presentation and delivery. For example, when determining that a network has low bandwidth, the service provider may transmit video data in black and white instead of color to optimize presentation and delivery of the service. When discussing FIGS. 15-17, the algorithm described in FIG. 14 is referred to algorithm A.

Figure 15:
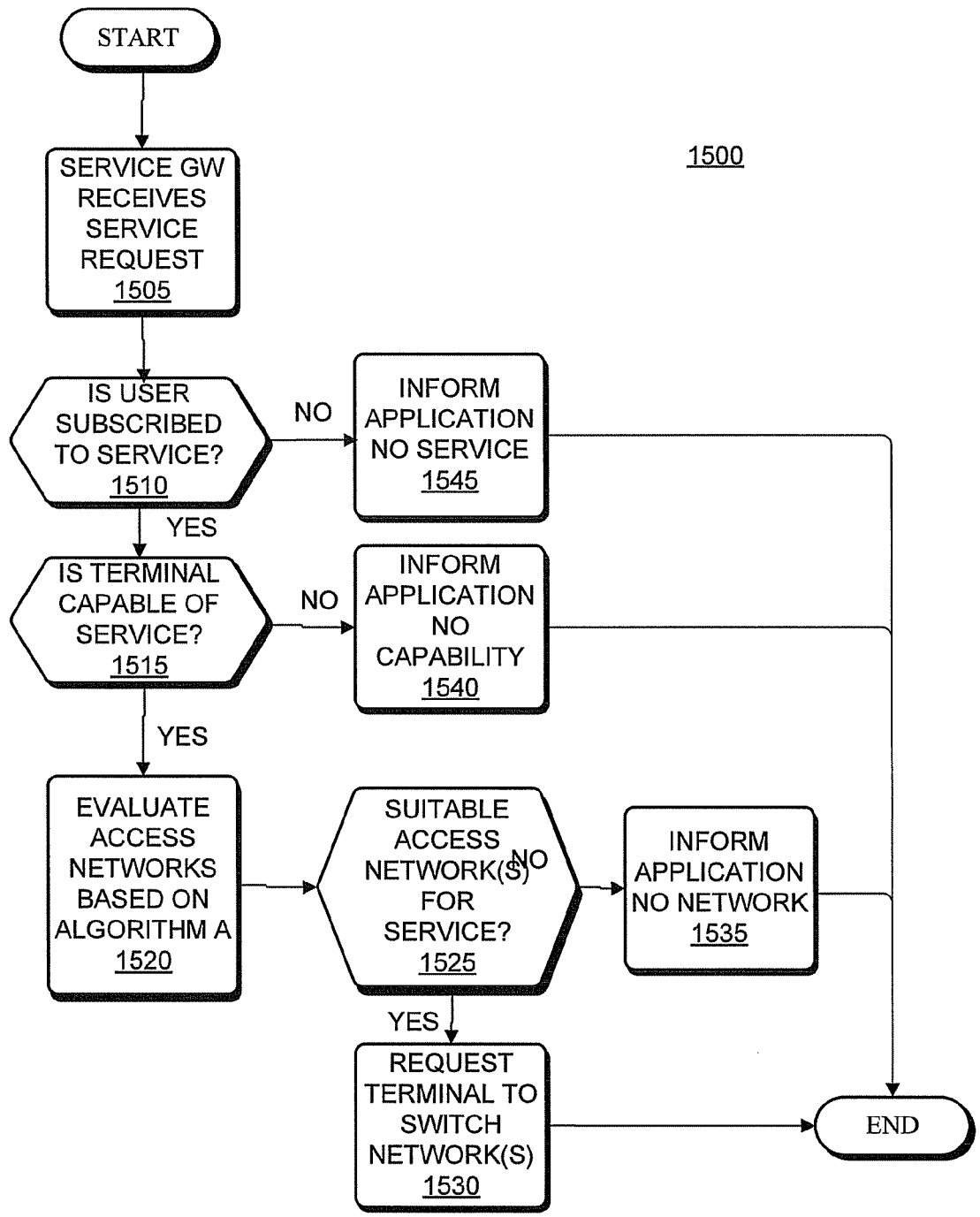
FIG. 15 is a flow diagram illustrating an exemplary method in efficiently delivering services over one or more wireless access networks when triggered by a request for service.

FIG. 15 is a flow diagram 1500 illustrating an exemplary method in efficiently delivering services over one or more wireless access networks when triggered by a request for service. At stage 1505, service gateway receives a service request. At stage 1510, the service gateway determines whether the user subscribed to the service. If not, at stage 1545, the service gateway informs the service application (see application server (230 and 234) in FIG. 2) that the user has not subscribed for the service and ends the process. However, if the user has subscribed to the service, at stage 1515, the service gateway determines whether the terminal is capable of providing the service. There may be cases where the terminal has not been upgraded to provide the requested service. If not, at stage 1540, the service gateway informs the service application that the terminal does not have the capability of providing the service and ends the process. However, if the terminal is capable of providing the service, at stage 1520 the service gateway evaluates the access networks based on algorithm A discussed when describing FIG. 14. At stage 1525, the service gateway determines whether the access network(s) are suitable for the service. If there are no suitable networks for the service, at stage 1535 the service gateway informs the service application and ends the process. However, if there are suitable networks, at stage 1530, the service gateway requests the terminal to switch network(s).

Figure 16:
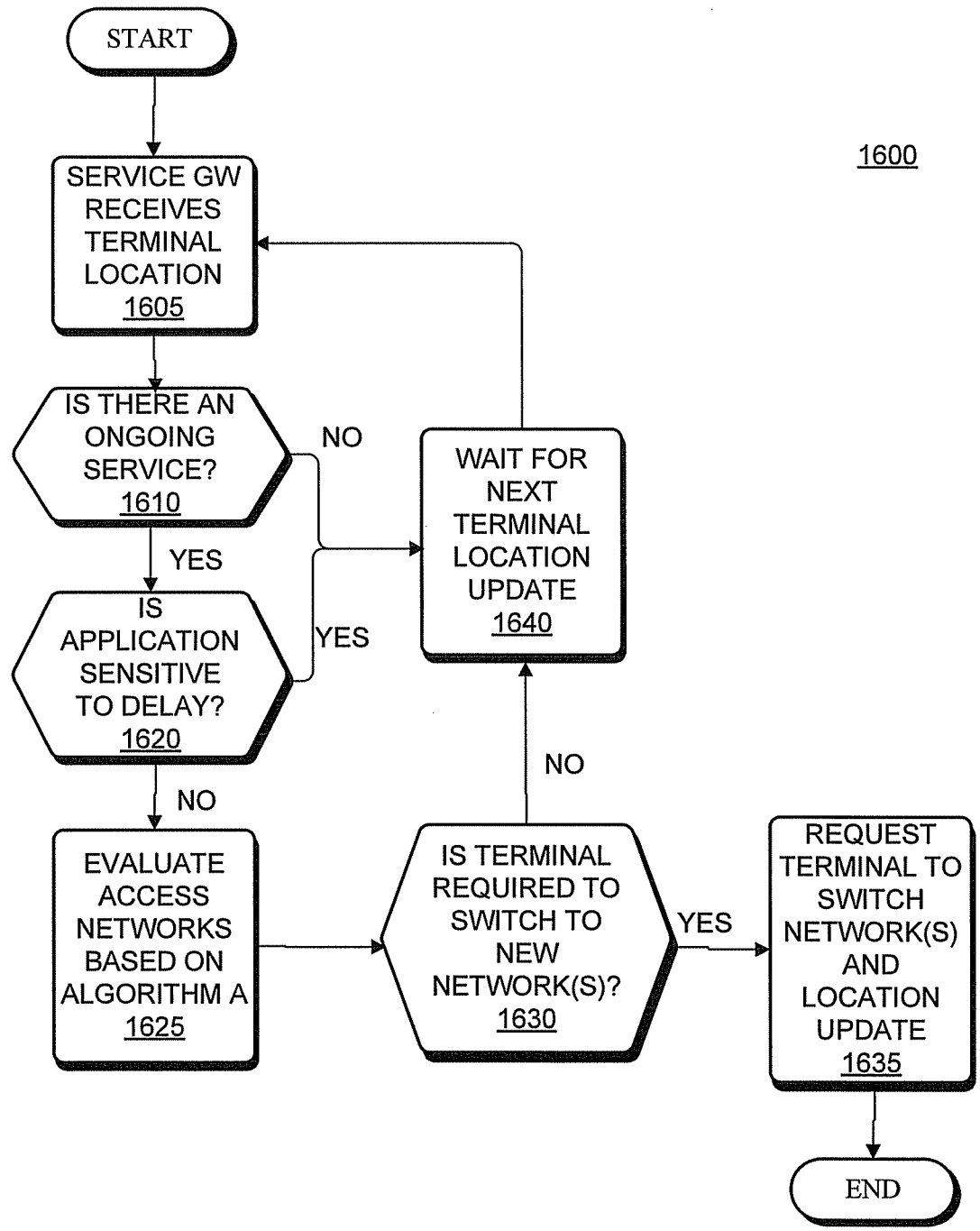
FIG. 16 is a flow diagram illustrating an exemplary method in efficiently delivering services over one or more wireless access networks when triggered by new location of a mobile terminal.

FIG. 16 is a flow diagram 1600 illustrating an exemplary method in efficiently delivering services over one or more wireless access networks when triggered by a new location of a mobile terminal. At stage 1605, the service gateway receives a new terminal location. At stage 1610, the service gateway determines whether there is ongoing service. If not, at stage 1640, the service gateway waits for next terminal location update. If so, at stage 1620, the service gateway determines whether the application is sensitive to delay. If so, at stage 1640, the service gateway waits for the next terminal location update. If not, at stage 1625, the service gateway evaluates access networks based on algorithm A discussed when describing FIG. 14. At stage 1630, the service gateway determines whether the terminal is required to switch to new network(s). If not, at stage 1640, the service gateway waits for the next terminal location update. If so, at stage 1635, the service gateway requests the terminal to switch network(s) and update its location.

Figure 17:
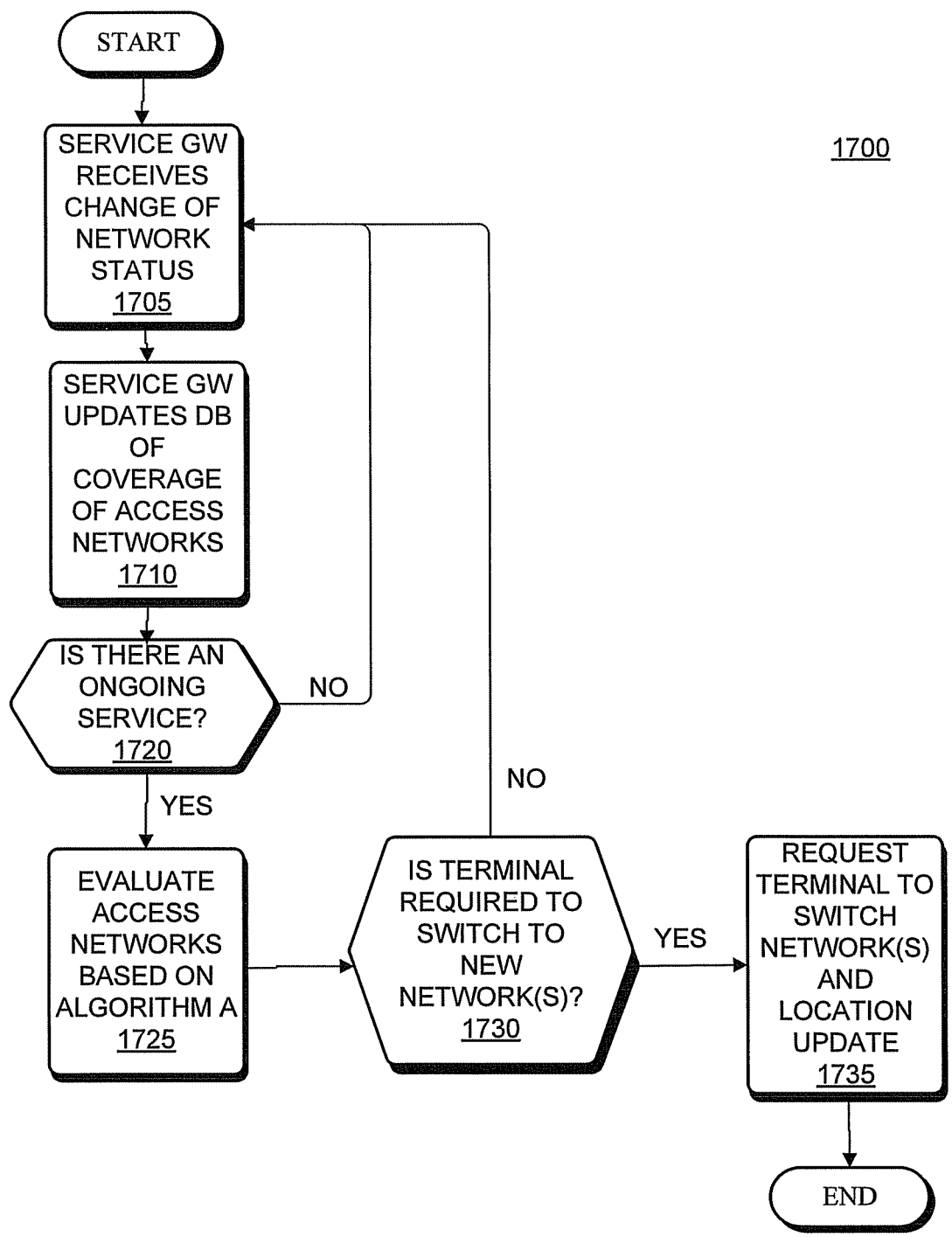
FIG. 17 is a flow diagram illustrating an exemplary method in efficiently delivering services over one or more wireless access networks when triggered by a change in network status.

FIG. 17 is a flow diagram 1700 illustrating an exemplary method in efficiently delivering services over one or more wireless access networks when triggered by a change in network status. At stage 1705, the service gateway receives a change of network status. A change in network status may result from an equipment outage, an increase in network bandwidth consumption, interference due to weather conditions, etc. At stage 1710, the service gateway updates the database of coverage of access networks. At stage 1720, the service gateway determines whether there is ongoing service. If not, the service gateway waits until it receives the next change in network status. If so, at stage 1725, the service gateway evaluates access networks based on algorithm A discussed when describing FIG. 14. At stage 1730, the service gateway determines whether the terminal is required to switch to new network(s). If not, the service gateway waits until it receives the next network status change. If so, at stage 1735, the service gateway requests the terminal to switch network(s) and update its location.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Examples of this invention are described herein, including the best mode known to the inventors for carrying out the invention. Variations of those examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for a telematics service provider to select one or more wireless access networks to deliver telematics services during a handoff procedure, the method comprising: receiving, by a telematics service provider computing system comprising a service gateway and a server, a telematics service request from a telematics unit of a telematics-equipped vehicle; providing, by the system, a telematics service corresponding to the telematics service request to the telematics unit via a first wireless access network; receiving, by the system, a location update from the telematics unit indicating the telematics unit has entered a new mobile coverage area while provision of the telematics service via the first wireless access network is ongoing; determining, by the system, in response to the location update indicating the telematics unit has entered the new mobile coverage area, multiple other wireless access networks capable of providing the telematics service, wherein each one of the multiple other wireless access networks corresponds to a different wireless access network type, and wherein the determining comprises: identifying a plurality of candidate wireless access networks; and filtering the plurality of identified candidate wireless access networks based on: each of the plurality of candidate wireless access networks' capability for delivering the telematics service, user preferences, and individual availability of particular ones of the plurality of candidate wireless access networks; determining, by the system, an efficiency parameter for each one of the multiple other wireless access networks, wherein the efficiency parameter for each one of the multiple other wireless access networks is based on the network characteristics for the respective wireless access network; selecting, by the system, one or more wireless access networks of the multiple other wireless access networks based on the determined efficiency parameters for handing off the telematics service from the first wireless network to the selected one or more wireless access networks; and providing, by the system, the telematics service to the telematics unit via the selected one or more wireless access networks, the telematics service provided via the selected one or more wireless access networks being adapted based on the type of the telematics service, the telematics unit's capabilities, and the selected one or more wireless access networks.

2. The method according to claim 1, wherein the plurality of wireless candidate access networks comprises wireless access networks of various types of wireless access networks from the group consisting of: wireless wide area networks, wireless metropolitan area networks, wireless local area networks, CDMA2000, Evolution Data Optimized (EVDO), High Speed Downlink Packet Access (HSDPA), GSM, WiFi, and WiMAX networks.

3. The method according to claim 1, wherein the telematics service is one of various types of telematics services from the group consisting of voice, voice call, video, video call, data, text messaging, instant messaging, image messaging, data messaging, file transfer, parameter administration, diagnostics, software download, and streaming media.

4. The method according to claim 1, wherein the network characteristics for each of the multiple other wireless access networks comprises bandwidth, security, latency, and cost parameters.

5. The method according to claim 1, wherein at least two wireless access networks are selected for providing the telematics service based on the determined efficiency parameters corresponding to the at least two wireless access networks, wherein each of the at least two wireless access networks is selected for providing a respective part of the telematics service.

6. The method according to claim 5, wherein the requested service is a streaming media service, and one of the at least two wireless access networks is selected for delivering an audio portion of the streaming media service and another of the at least two wireless access networks is selected for delivering a video portion of the streaming media service.

7. The method according to claim 1, wherein providing the telematics service via the one or more selected access networks includes providing video data, and the video data is adapted prior to being provided by converting color content corresponding to the video data to a black and white content corresponding to the video data.

8. A non-transitory, processor-readable medium having processor-executable instructions stored thereon for a telematics service provider to select one or more wireless access networks to deliver telematics services during a handoff procedure, the processor-executable instructions, when executed by a processor, facilitating the following steps: receiving a telematics service request from a telematics unit of a telematics-equipped vehicle; providing a telematics service corresponding to the telematics service request to the telematics unit via a first wireless access network; receiving a location update from the telematics unit indicating the telematics unit has entered a new mobile coverage area while provision of the telematics service via the first wireless access network is ongoing; determining, in response to the location update indicating the telematics unit has entered the new mobile coverage area, multiple other wireless access networks capable of providing the telematics service, wherein each one of the multiple other wireless access networks corresponds to a different wireless access network type, and wherein the determining comprises: identifying a plurality of candidate wireless access networks; and filtering the plurality of identified candidate wireless access networks based on: each of the plurality of candidate wireless access networks' capability for delivering the telematics service, user preferences, and individual availability of particular ones of the plurality of candidate wireless access networks; determining an efficiency parameter for each one of the multiple other wireless access networks, wherein the efficiency parameter for each one of the multiple other wireless access networks is based on the network characteristics for the respective wireless access network; selecting one or more wireless access networks of the multiple other wireless access networks based on the determined efficiency parameters for handing off the telematics service from the first wireless network to the selected one or more wireless access networks; and providing the telematics service to the telematics unit via the selected one or more wireless access networks, the telematics service provided via the selected one or more wireless access networks being adapted based on the type of the telematics service, the telematics unit's capabilities, and the selected one or more wireless access networks.

9. The non-transitory processor-readable medium according to claim 8, wherein the plurality of candidate wireless access networks comprises wireless access networks of various types of wireless access networks from the group consisting of: wireless wide area networks, wireless metropolitan area networks, wireless local area networks, CDMA2000, Evolution Data Optimized (EVDO), High Speed Downlink Packet Access (HSDPA), GSM, WiFi, and WiMAX networks.

10. The non-transitory processor-readable medium according to claim 8, wherein the telematics service is one of various types of telematics services from the group consisting of voice, voice call, video, video call, data, text messaging, instant messaging, image messaging, data messaging, file transfer, parameter administration, diagnostics, software download, and streaming media.

11. The non-transitory processor-readable medium according to claim 8, wherein the network characteristics for each of the multiple other wireless access networks comprises bandwidth, security, latency, and cost parameters.

12. The non-transitory processor-readable medium according to claim 8, wherein selecting the one or more of the multiple wireless access networks comprises selecting at least two wireless access networks for providing the telematics service based on the determined efficiency parameters corresponding to the at least two wireless access networks, wherein each of the at least two wireless access networks is selected for providing a respective part of the telematics service.

13. The non-transitory processor-readable medium according to claim 12, wherein the requested service is a streaming media service, and one of the at least two wireless access networks is selected for delivering an audio portion of the streaming media service and another of the at least two wireless access networks is selected for delivering a video portion of the streaming media service.

14. The non-transitory processor-readable medium according to claim 8, wherein providing the telematics service via the one or more selected access networks includes providing video data, and the video data is adapted prior to being provided by converting color content corresponding to the video data to a black and white content corresponding to the video data.

15. A system for a telematics service provider to select one or more wireless access networks to deliver telematics services during a handoff procedure, the system comprising: a telematics service provider system comprising a service gateway and a server, the telematics service provider system being configured to: receive a telematics service request from a telematics unit of a telematics-equipped vehicle; provide a telematics service corresponding to the telematics service request to the telematics unit via a first wireless access network; receive a location update from the telematics unit indicating the telematics unit has entered a new mobile coverage area while provision of the telematics service via the first wireless access network is ongoing; determine, in response to the location update indicating the telematics unit has entered the new mobile coverage area, multiple other wireless access networks capable of providing the telematics service, wherein each one of the multiple other wireless access networks corresponds to a different wireless access network type, and wherein the determining comprises: identify a plurality of candidate wireless access networks; and filter the plurality of identified candidate wireless access networks based on: each of the plurality of candidate wireless access networks' capability for delivering the telematics service, user preferences, and individual availability of particular ones of the plurality of candidate wireless access networks; determine an efficiency parameter for each one of the multiple other wireless access networks, wherein the efficiency parameter for each one of the multiple other wireless access networks is based on the network characteristics for the respective wireless access network; select one or more wireless access networks of the multiple other wireless access networks based on the determined efficiency parameters for handing off the telematics service from the first wireless network to the selected one or more wireless access networks; and provide the telematics service to the telematics unit via the selected one or more wireless access networks, the telematics service provided via the selected one or more wireless access networks being adapted based on the type of the telematics service, the telematics unit's capabilities, and the selected one or more wireless access networks the telematics unit of the telematics-equipped vehicle, the telematics unit being configured to send the telematics service request to the telematics service provider computing system and to receive the telematics service provided by the telematics service provider computing system via the first wireless access network and via the selected one or more wireless access networks.

16. The system according to claim 15, wherein at least two wireless access networks are selected for providing the telematics service based on the determined efficiency parameter corresponding to the at least two wireless access networks, wherein each of the at least two wireless access networks is selected for providing a respective part of the telematics service.

* * * * *